United States Patent [19]

Lawroski

[11] 4,241,858

[45] Dec. 30, 1980

[54] CARRIER ACCESSORY FOR VANS

[76] Inventor: George Lawroski, 23208 Raven Ave., East Detroit, Mich. 48021

[21] Appl. No.: 51,023

[22] Filed: Jun. 22, 1979

[51] Int. Cl.³ .............................................. B60R 9/04
[52] U.S. Cl. ...................... 224/42.03 A; 224/42.03 R; 224/42.21
[58] Field of Search ...................... 224/42.03 A, 42.12, 224/42.13, 42.03 R, 273, 42.21; 296/1 C, 37.1

[56] References Cited

U.S. PATENT DOCUMENTS

| | | | |
|---|---|---|---|
| 3,228,576 | 1/1966 | Gaukel | 224/42.03 A |
| 3,658,201 | 4/1972 | Williams et al. | 224/42.21 X |
| 3,902,642 | 9/1975 | McNeece | 224/42.03 R |

Primary Examiner—Steven M. Pollard
Attorney, Agent, or Firm—Barnes, Kisselle, Raisch & Choate

[57] ABSTRACT

A carrier for sporting goods, tools, household supplies and the like utilizing a bracket adaptable to vans of various manufacturers and supportable on existing hinge brackets of the rear doors of a van with supplemental support from a frame or bumper member. The carrier on the supporting bracket can be a closed container or a specialty rack for specific articles, sporting gear, tools, provisions and the like.

8 Claims, 15 Drawing Figures

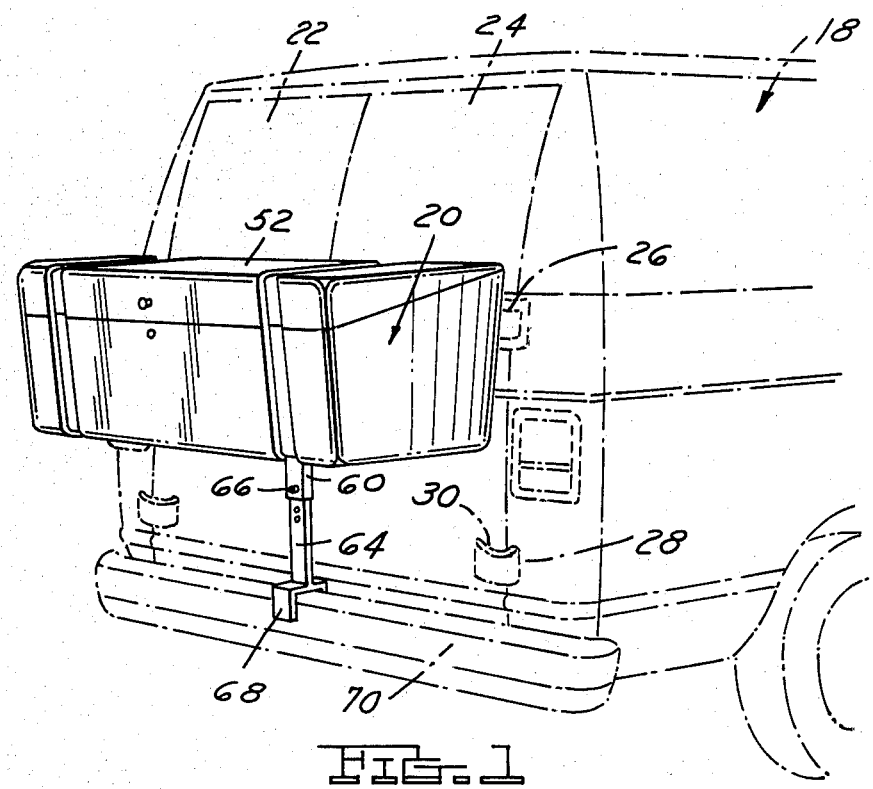
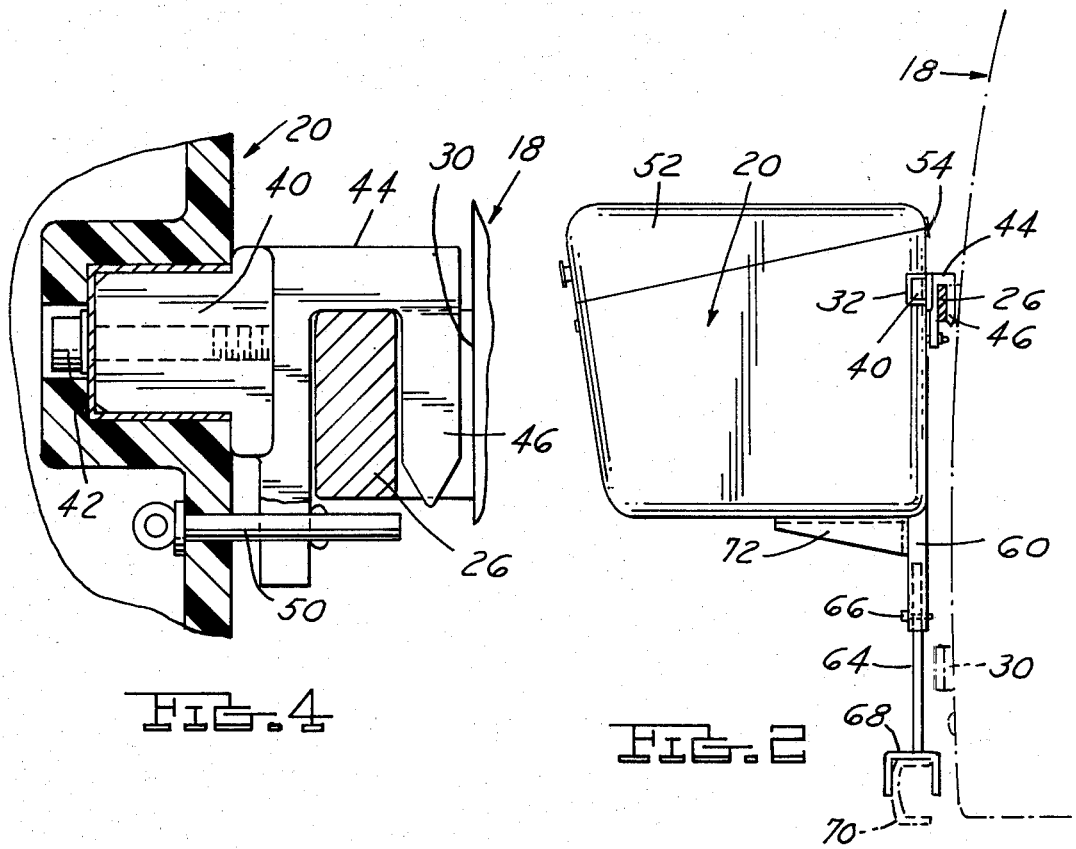

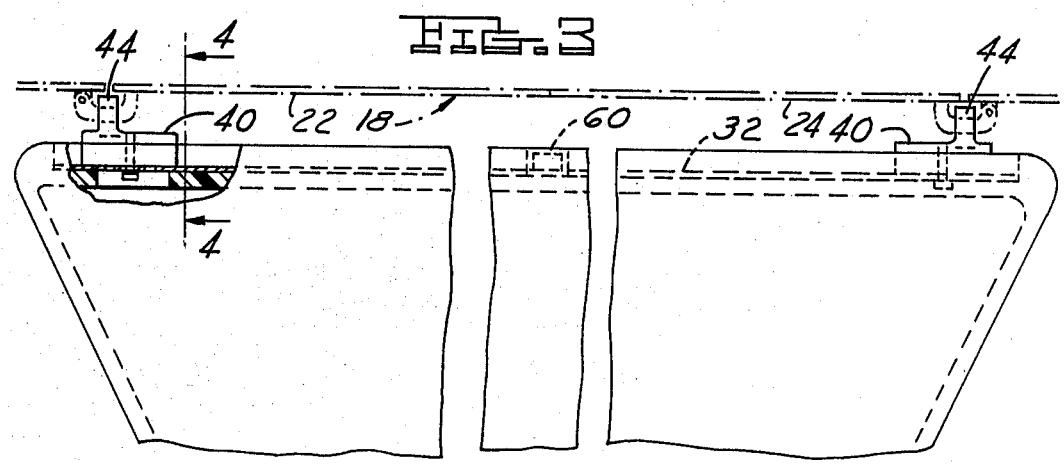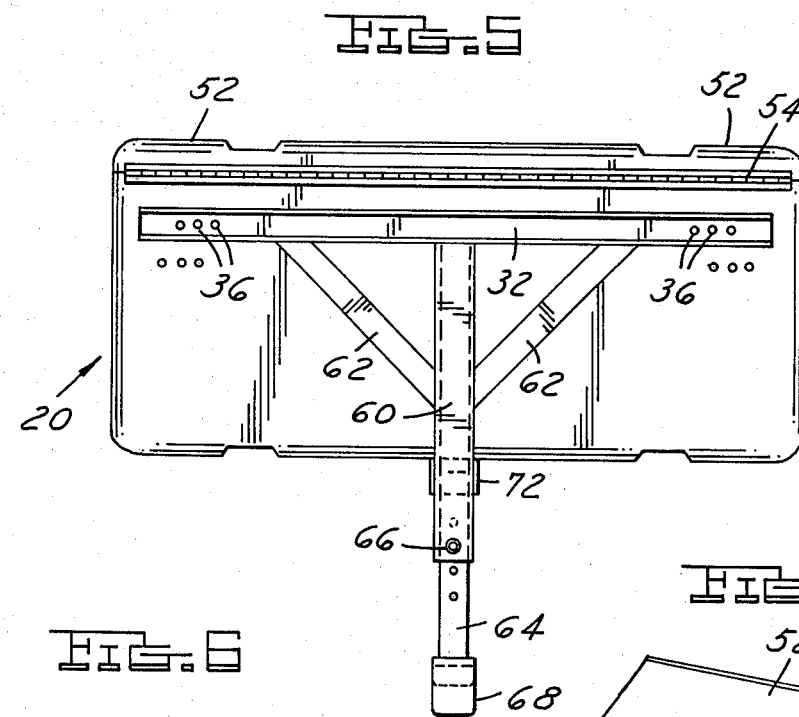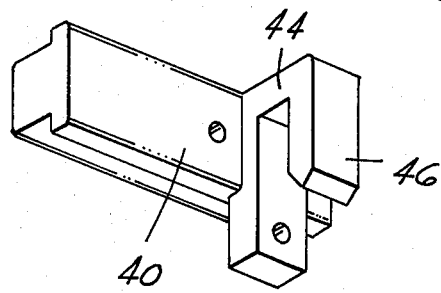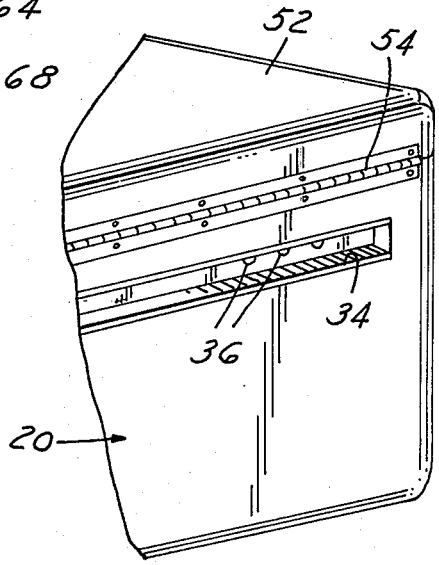

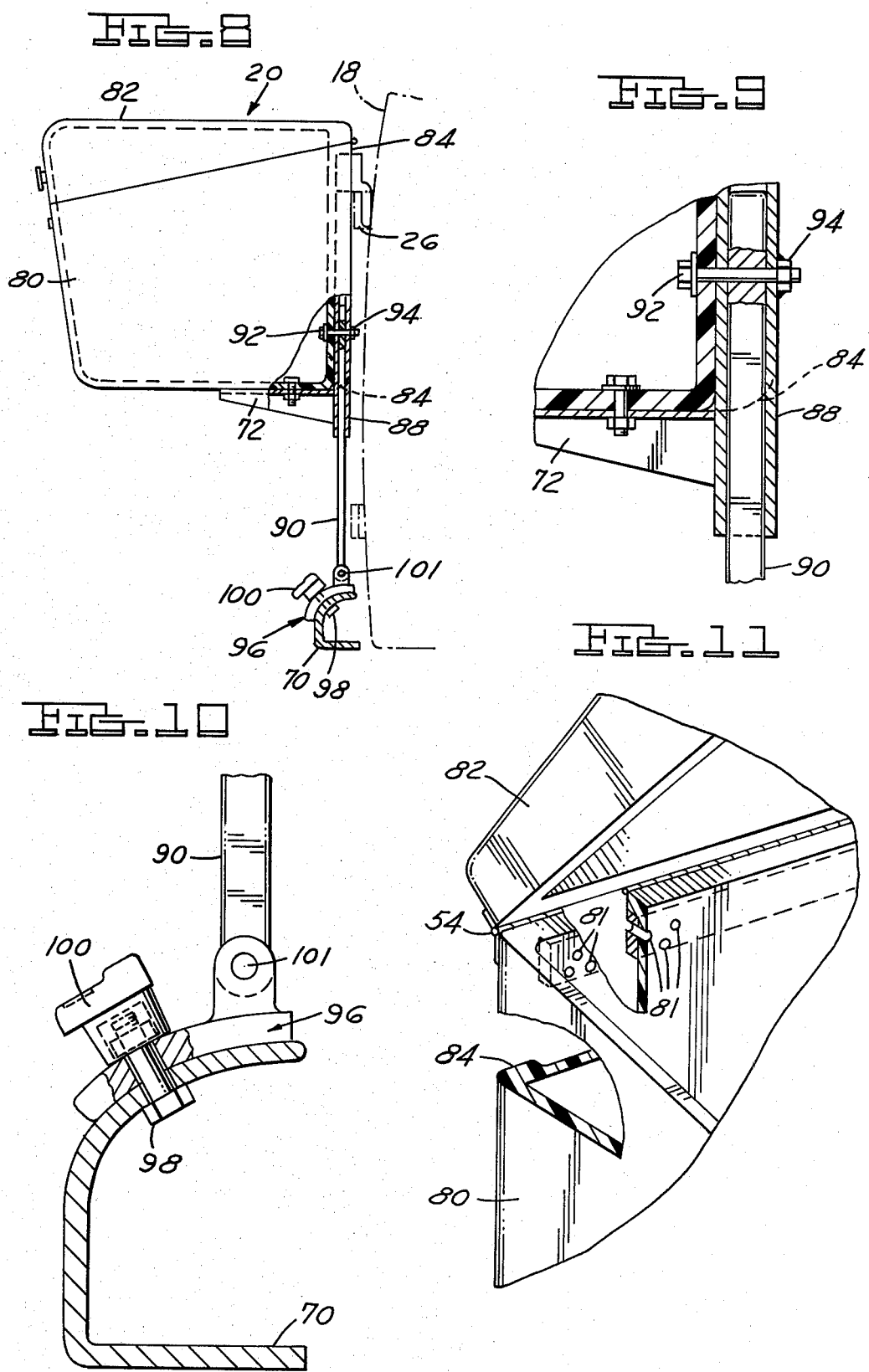

1

CARRIER ACCESSORY FOR VANS

FIELD OF INVENTION

Storage mounts for the rear end of van type vehicles providing closed containers and outboard motor supports.

BACKGROUND OF THE INVENTION

Vehicles of the van type have an enclosed body usually with two rear doors which are hinged at the outside edges and swing toward the center and also with a sliding side door which provides access to the interior of the van body. When the van is used for a family vehicle or for camping and mobile home adaptations, the side door is usually the only door utilized by the occupants. Furthermore, with children in the van, it is desirable that the rear doors be blocked from opening. Also, with furnishing items in the van such as bunks, stoves, refrigerators and the like, the space inside the rear doors is frequently filled so the doors cannot be used.

In addition, with the compact household facilities arranged in the van, there is a need for yet additional storage space for camping and household equipment, tools and the like.

OBJECTS OF THE PRESENT INVENTION

It is an object of the present invention to utilize the hinge brackets of the rear doors of a van together with another portion of the vehicle, such as the doors or a bumper, to support a storage accessory on the back of the van where it is out of the air stream and thus does not provide a drag on the vehicle in motion.

It is a further object to provide a storage bracket readily attachable to a van which can support a closed container on an outboard motor rack support or other support devices for camping or outdoor sports, tools, provisions, and sporting gear.

The mounting bracket is designed to be adaptable to vans made by various manufacturers and fully acceptable relative to license plate and rear light visibility. Another object is a sealed construction which provides protection against the weather and also security relative to unauthorized break-in.

The bracket is designed so that it can be readily stored on any vertical support and is secure against theft on or off the vehicle.

A further object is a base or bottom support which is adaptable to different vehicles and a support which can be utilized without modification of the vehicle.

Other objects and features of the invention relating to details of construction and operation will be apparent in the following description and claims in which the principles of the invention are set forth, together with details to enable a person skilled in the art to make and use the invention, all in connection with the best modes presently contemplated for the invention.

BRIEF DESCRIPTION OF THE DRAWINGS

Drawings accompany the disclosure and the various views thereof may be briefly described as:

FIG. 1, a perspective view of a van carrier unit in position.

FIG. 2, a side view of the carrier.

FIG. 3, a top view of the carrier of FIG. 1.

FIG. 4, a sectional view of a support element taken on line 4—4 of FIG. 3.

FIG. 5, an elevation of the carrier and support bracket from the attachment side of the unit.

FIG. 6, a perspective view of a bracket end.

FIG. 7, a partial view of the back of a closed carrier element showing a bracket recess.

FIG. 8, a side view of a modified carrier structure.

FIG. 9, a detail of an adjustable vertical bracket for the modified carrier.

FIG. 10, a detail of a bumper attachment for a vertical carrier bracket.

FIG. 11, a view inside the container showing the holes for bracket attachment.

DETAILED DESCRIPTION OF INVENTION AS ILLUSTRATED IN THE DRAWINGS

Figure 12:
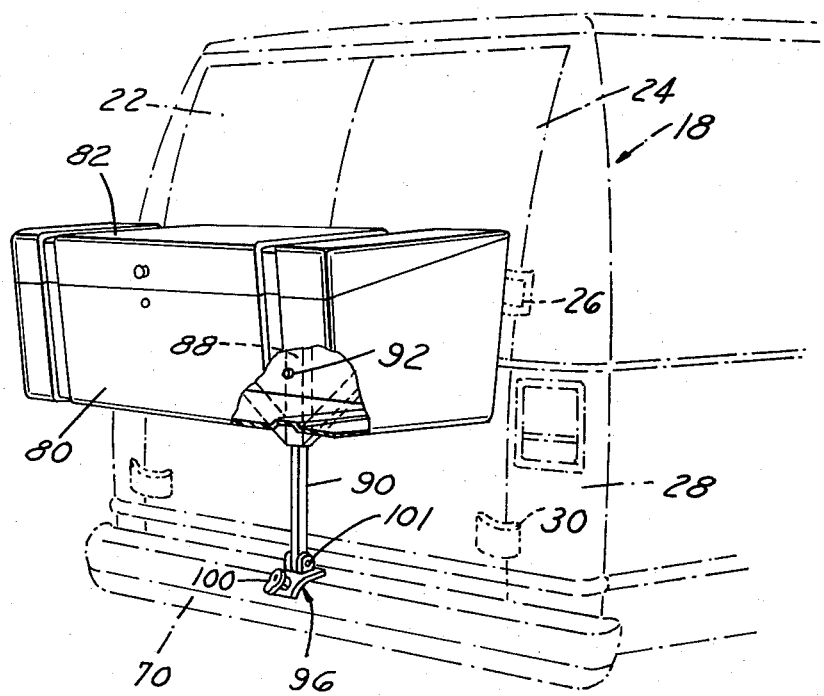
FIG. 12, a view of the modified carrier model assembled on a van.
Figure 13:
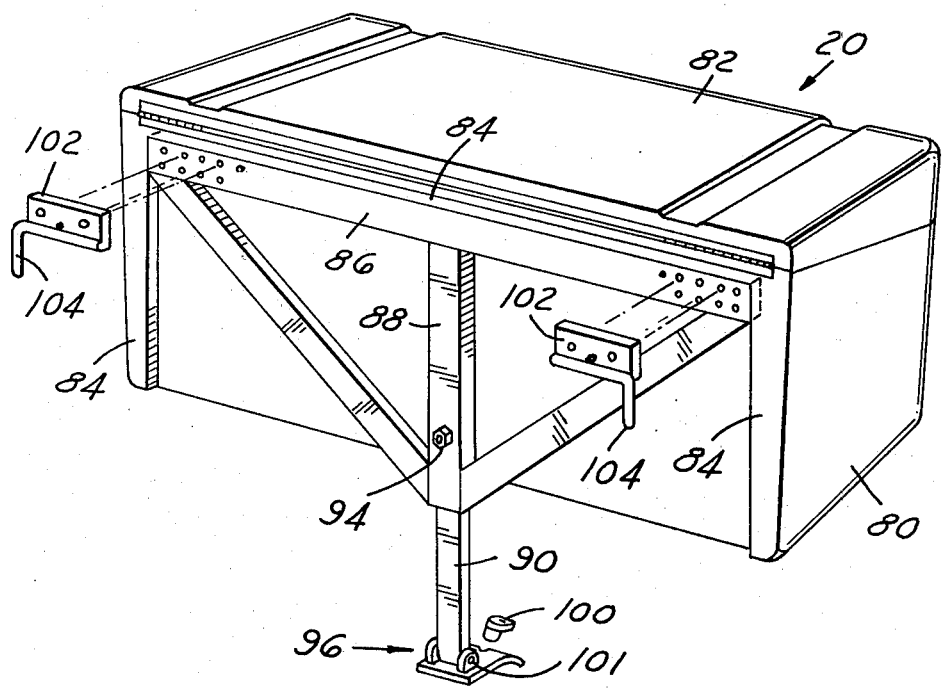
FIG. 13, a rear view of the support assembly shown in FIG. 8.

In FIG. 1, a van type vehicle 18 is illustrated in dash-lines and a formed metal or shaped plastic container 20, such as fiber glass, is shown on the back of the vehicle. Each rear door 22 and 24 on the van has two hinges: an upper hinge 26 and a lower hinge 28. These hinges project from the vehicle body and each form a loop with an opening 30 formed between the body and the hinge.

In FIGS. 2 to 7, one embodiment of a support bracket is illustrated. A horizontal channeled cross bar 32 is recessed in the rear wall of the housing 20 in a longitudinal recess 34, FIG. 7. Suitable fasteners in holes 36 will secure the bar 32 to the housing 20. T-shaped end slides 40 will interfit in the channel of the bar 32 and be secured by one or more bolts 42 (FIG. 4) accessible only from inside the container 20. The end slides 40 will adjust endwise to accommodate to various makes of vehicles, each of which may have hinges with slightly different spacing. Each end slide has a hook bracket 44 secured thereto with a depending portion 46 to interfit into the opening 30 and thus be supported on the hinge. A pin lock 50 of any suitable standard construction can be used to lock the hook 44 on the hinge. This pin lock can be accessible only from the inside of the container 20. The container has a cover 52 hinged at 54.

Depending centrally from the horizontal bracket channel 32 is a vertical support tube or stanchion 60 which can be braced by side arms 62 (FIG. 5) if desired. This tube 60 is secured to the horizontal channel 32 and receives a slide support 64 in telescoping relation which can be adjustably positioned in tube 60 and affixed by a pin or bolt 66. At the low end of slide 64 is an inverted U-bracket 68 which fits over and rests on the top surface of a bumper 70. A horizontal bracket support 72 (FIG. 2) extends from tube 60 to provide a bottom rest for the container 20.

In FIGS. 8 to 13, a modified structure is illustrated. In FIG. 8, the van body 18 has a hinge 26 as previously described. The container 80 has a cover 82 and the forward wall of the container facing the van is formed with the outer ends wrapped forward at 84 to leave a hidden recess between these wrap arounds 84 when viewed from the side.

A T-bar has a horizontal run 86 with a depending tube 88 which receives the flat shaft 90 in an adjustable telescoping relation fixed by a bolt 92 accessible on the inside of the container threaded into a nut 94 welded to the back of the bracket tube 88. The shaft 90 has a saddle piece 96 at the bottom (FIGS. 8, 9 and 10) to fit the top surface of a bumper. Preferably a hole is drilled in the center of the bumper and a bolt 98 (FIG. 10) secures the saddle piece 96 to the bumper. A key lock nut 100 can be used for this bolt. Because the angle of the top surface of various bumpers may vary, it is desirable that the saddle piece 96 be pivoted to the shaft 90 by a suitable yoke and pivot bolt 101.

The T-bar (FIG. 13) is secured to the back of the container 80 by suitable bolts or rivets 81 (FIG. 11) and the ends of the horizontal run 86 has a series of holes to register with holes in hook plates 102 provided with pins 104. Bolts are used to fasten the hook plates on the back of the container and on the run 86 in a suitably spaced position to fit a particular van.

The wrap-around ends 84 thus shrouds the mounting structure on the forward surface of the container facing the van, as viewed from the side of the unit. The ends of the containers 20 and 80 are angled back on converging planes to allow the required visibility of the rear lights of the van. Also, the structure does not interfere with the visibility of a license plate fastened on the bumper.

Thus, it will be seen that when the cover of the containers 20 and 80 are locked in position, the fastening means are enclosed and not accessible. But the entire container assembly can be readily removed from the van if this is desired by simply releasing the bumper connection and lifting the unit off the supporting hinge loops. Also, by releasing the bumper yoke and lifting one end of the container to unhook it from the hinge, the released end may be walked out to a clearance position so that the rear doors of the van may be opened to allow temporary access if this is desirable.

While one configuration is shown of a container, other shapes can be utilized if desired. The containers can readily handle contents of two hundred pounds.

Figure 14:
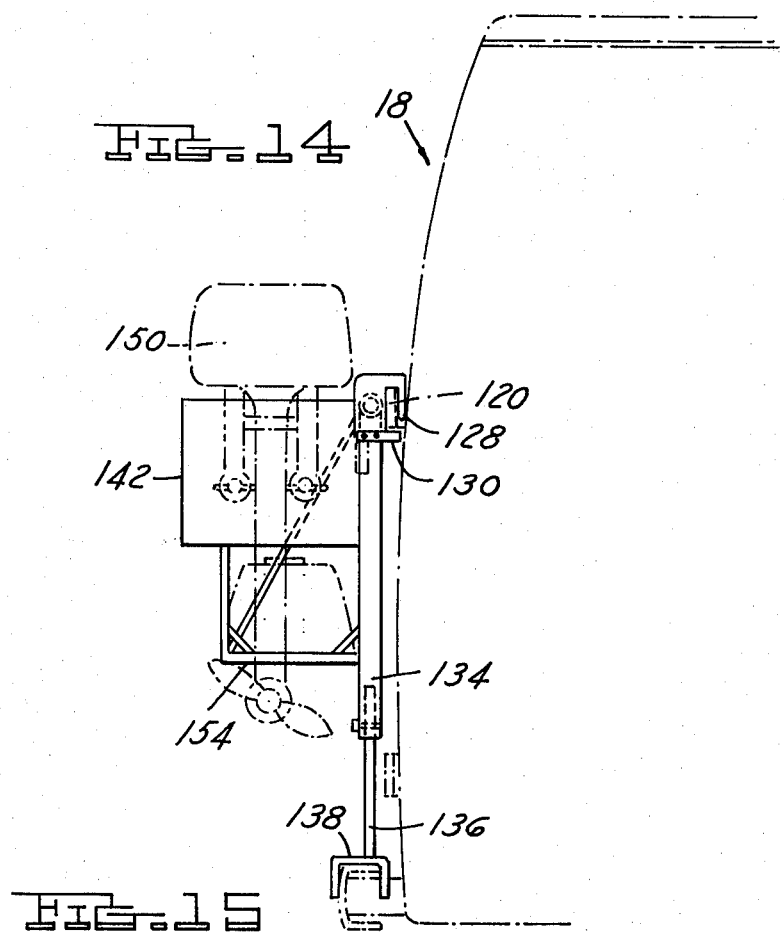
FIG. 14, a side view of a specialized carrier for outboard motors on a support bracket.
Figure 15:
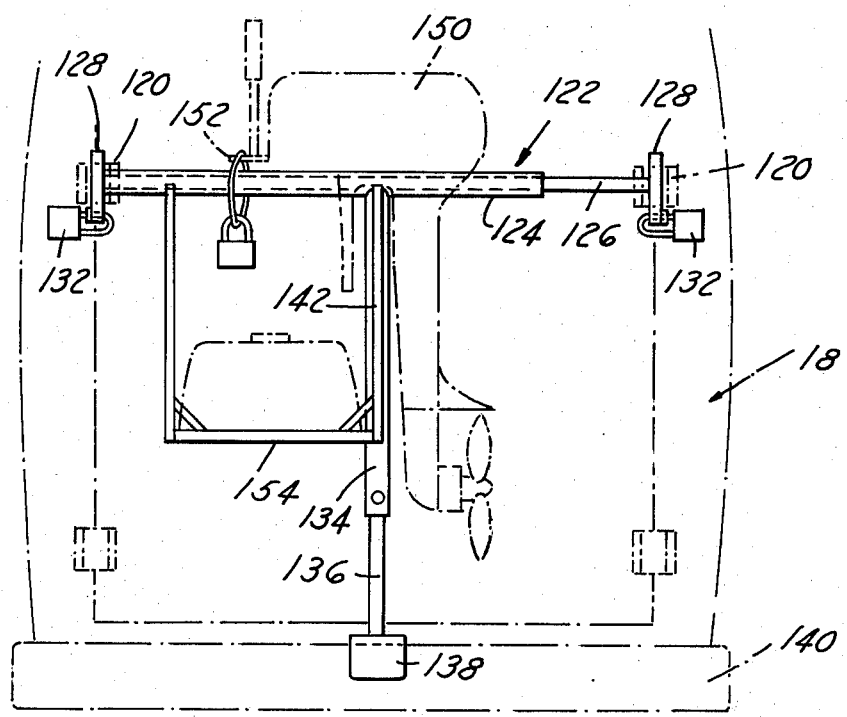
FIG. 15, a rear view of a specialized carrier for outboard motors.

In FIGS. 14 and 15, a specialized assembly is illustrated with a modified structure. The hinges 120 on a van body support a T-bar bracket having a horizontal bar formed of telescoping parts 124 and 126 each part having a dependent hook portion 128 which cooperates with the respective hinge loops. A latch piece 130 can be raised to a position below each hinge and locked by the hasp of a padlock 132.

The vertical bar of the T-bar assembly also is composed of a tubular element 134 and a rod 136 with a support saddle 138 to fit the bumper 140.

Projecting rearwardly from the T-bar assembly is a mounting board 142 which serves as a mount for an outboard motor 150. The motor can be supported on the board 142 in the same way that it hangs on the transom of a boat. It can be locked on as shown at 152. A hanger shelf 154 for a fuel tank can also be suspended on the bracket elements. Other equipment can also be carried on this bracket such as gas bottles, bicycles, motorcycles and other devices. The hinges on the vans are rugged in constructions and these carriers can easily handle two to three hundred pounds and over.

While the invention has been described for use with a van type vehicle, suitable supports on other vehicles such as motor homes or pick-up trucks could be provided to adapt to the bracket frame and hooks. The bumper support can serve in the same capacity as described, i.e., a supplemental vertical load bearing member and tie down to stabilize the assembly.

What I claim is:

1. A carrier accessory combination for vehicles which comprises in combination:
   (a) a van-type vehicle having a body and rear swing doors which open from the center and a rear bumper,
   (b) hinge loops on the outside edges of said doors extending rearwardly from the surface of the van body and doors,
   (c) a support bracket having a horizontal member to extend across said doors substantially to span the distance between hinges of said respective doors,
   (d) first load carrying means including a depending member adjacent but spaced from each end of said horizontal member to project over and into a hinge loop of the van body,
   (e) second load carrying means associated with said horizontal member comprising a vertical member to serve as a supplemental vertical load carrier and tie down means to stabilize said horizontal member vertically on said body, said vertical member being supported on said rear bumper, and
   (f) carrier means supported on said bracket to serve to carry sporting gear and the like.

2. A carrier accessory for use in combination with van-type vehicles and the like having rear swing door facilities and spaced support loop hinges projecting from the rear of the van body or spaced support loops on the vehicle body which comprises:
   (a) a bracket having a horizontal member to extend across the rear of the vehicle,
   (b) first means including a depending member adjacent each end of said member to project over and into a support loop on the vehicle,
   (c) second means associated with said member to serve as a supplemental vertical load carrier and tie down means to stabilize said member on said body,
   (d) carrier means supported on said horizontal member to serve to carry sporting gear and the like,
   (e) said first means comprising end brackets adjustably associated with the respective ends of said horizontal member each having a depending finger to insert into a support loop, and
   (f) said first means telescopically engaging with said member, and bolts transfixing said first means and said member to secure in an adjusted position.

3. A carrier accessory for use in combination with van-type vehicles and the like having rear swing door facilities and spaced support loop hinges projecting from the rear of the van body or spaced support loops on the vehicle body which comprises:
   (a) a bracket having a horizontal member to extend across the rear of the vehicle,
   (b) first means including a depending member adjacent each end of said member to project over and into a support loop on the vehicle,
   (c) second means associated with said member to serve as a supplemental vertical load carrier and tie down means to stabilize said member on said body,
   (d) carrier means supported on said horizontal member to serve to carry sporting gear and the like, and
   (e) said second means comprising a depending stanchion centrally affixed to said member comprising telescoping elements adjustably related, and means on the lower end of said elements to rest on a rear bumper of a vehicle to stabilize and support said member.

4. A carrier accessory as defined in claim 3 in which said means on the lower end of said stanchion comprises a U-shaped bracket to straddle a bumper transversely.

5. A carrier accessory as defined in claim 3 in which said means on the lower end of said stanchion comprises a saddle piece pivotally associated with said stanchion to adjust to varying angles of the top surfaces of bumpers.

6. A carrier accessory as defined in claim 3 in which said means on the lower end of said stanchion comprises a saddle piece to rest on the top of a bumper, bolt means transfixing said piece and said bumper, and a lock nut means on said bolt to prevent unauthorized removal.

7. A carrier accessory for use in combination with van-type vehicles and the like having rear swing door facilities and spaced support loop hinges projecting from the rear of the van body or spaced support loops on the vehicle body which comprises:
 (a) a bracket having a horizontal member to extend across the rear of the vehicle,
 (b) first means including a depending member adjacent each end of said member to project over and into a support loop on the vehicle,
 (c) second means associated with said member to serve as a supplemental vertical load carrier and tie down means to stabilize said member on said body,
 (d) carrier means supported on said horizontal member to serve to carry sporting gear and the like,
 (e) said carrier means comprising an elongate hollow container having a closure means, and fastening means connecting said container to said member accessible only from the inside of said container, and
 (f) releasable locking means projecting from said container below said hinge loop to block removal of said member, said locking means being releasable only from the inside of said container.

8. A carrier accessory for use in combination with van-type vehicles and the like having rear swing door facilities and spaced support loop hinges projecting from the rear of the van body or spaced support loops on the vehicle body which comprises:
 (a) a bracket having a horizontal member to extend across the rear of the vehicle,
 (b) first means including a depending member adjacent each end of said member to project over and into a support loop on the vehicle,
 (c) second means associated with said member to serve as a supplemental vertical load carrier and tie down means to stabilize said member on said body,
 (d) carrier means supported on said horizontal member to serve to carry sporting gear and the like, and
 (e) said bracket comprising a telescoping member on each end of said horizontal member, each movable to span varying hinge spacings on a vehicle, and each telescoping member carrying said first means in the form of a forwardly and downwardly extending hook to engage a hinge loop on a van.

* * * * *